Nov. 14, 1967  T. T. LIGON  3,352,147
CONSTRUCTION HEADER

Filed March 14, 1966  2 Sheets-Sheet 2

INVENTOR.
TOM T. LIGON
BY
ATTORNEY ated Nov. 14, 1967

United States Patent Office 3,352,147
Patented Nov. 14, 1967

3,352,147
CONSTRUCTION HEADER
Tom T. Ligon, P.O. Box 1025, Clemson, S.C. 29631
Filed Mar. 14, 1966, Ser. No. 540,450
2 Claims. (Cl. 73—40.5)

This invention relates to a construction header for aiding in assembling pipes which communicate with a gas meter and for testing such pipes for leakage.

In installing a service pipe and a consumer pipe for a gas meter, it is important that they be spaced properly for connection to a gas meter. When the pipes are not spaced properly undue twisting and strain are exerted upon them during the installation of the gas meter frequently causing connecting joints to leak. Moreover, the twisted pipes do not give as neat an appearance as properly aligned pipe. Heretofore, meter bars have been utilized for positioning the service pipe relative to the consumer pipe. However, in order to test the pipes against leaks or to seal the ends of the pipes to avoid contamination from trash, dust or insects, such as wasp and dirt dobbers, plugs have to be used with the spacing bars.

Accordingly, an important object of the present invention is to provide a construction header which aids in aligning a service pipe for a gas meter relative to a consumer pipe so that the pipes are properly positioned for connection to a gas meter.

Another important object of the present invention is to provide a construction header which seals the ends of a service pipe and consumer pipe, which normally are connected to a gas meter, so that the pipes may be tested against leakage.

Still another object of the present invention is to provide a construction header which can be substituted for a gas meter when such is disconnected from the service pipe and consumer pipe to avoid contamination of the pipes by foreign objects, such as dust and insects.

A further object of the present invention is to provide a construction header which can be more easily and quickly installed than meter bars now on the market.

A further object of the present invention is to provide a device for improved installation, testing and servicing natural gas pipes.

Still another object of the present invention is to provide a construction header which can be connected to a service pipe and a consumer pipe when a gas meter has been disconnected from such pipes to produce a sturdy pipe assembly which is not easily damaged by shocks and jars.

Figure 1:
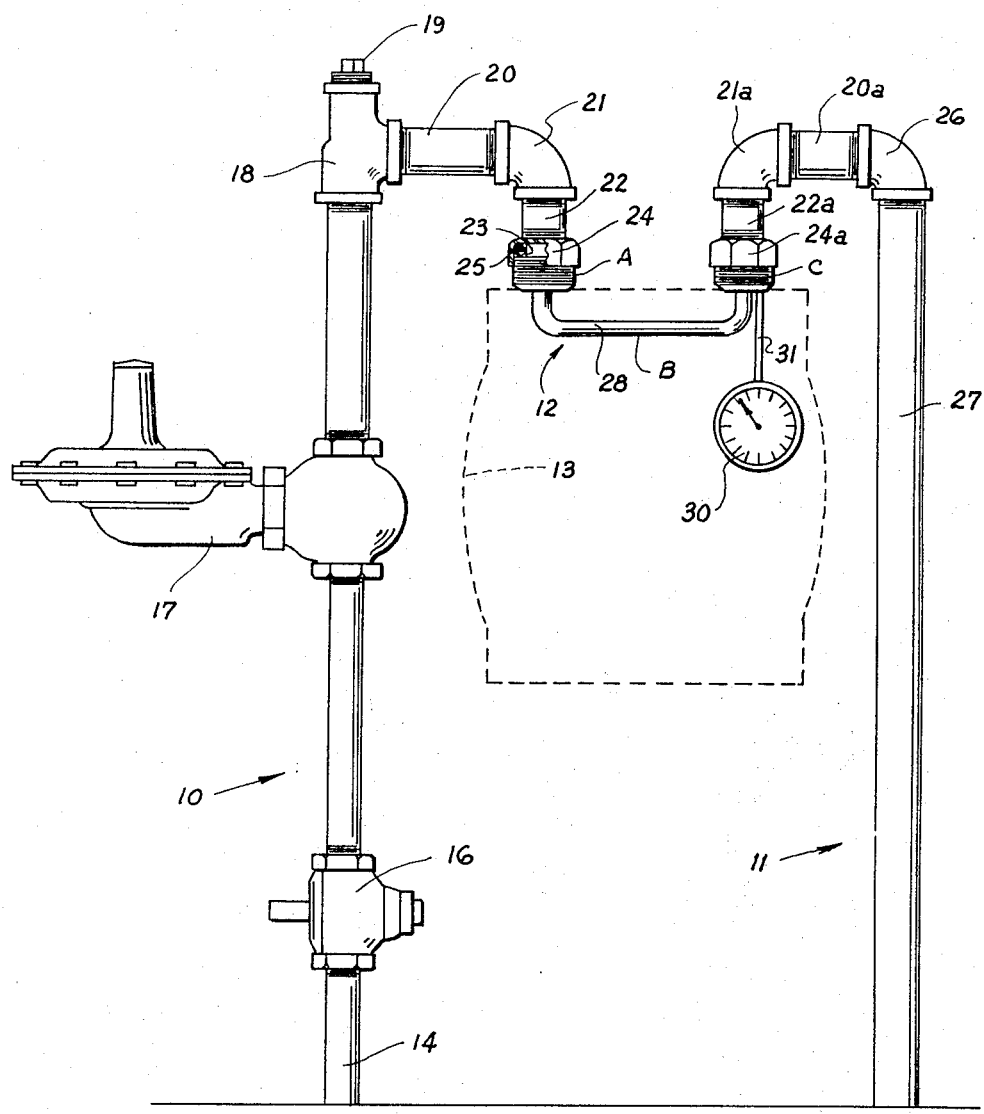
Figure 2:
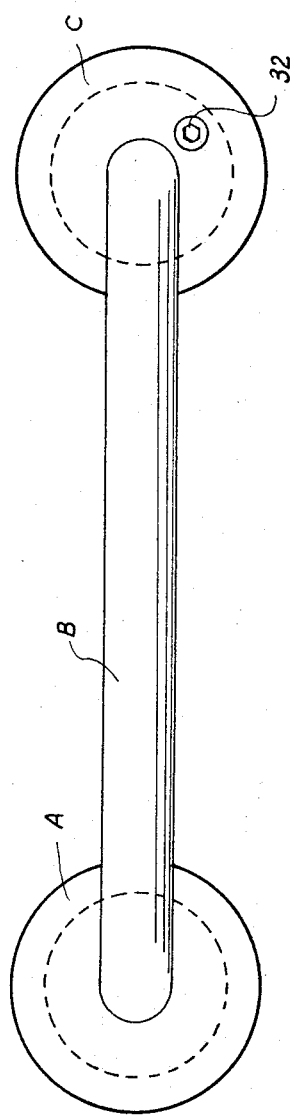
Figure 3:
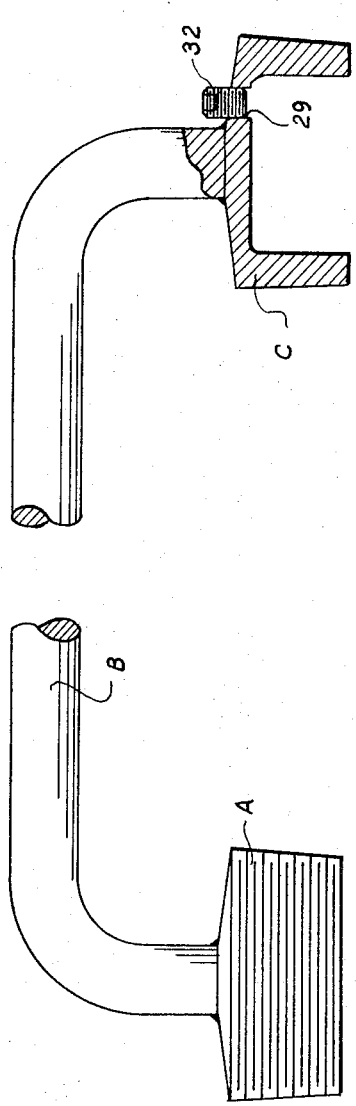

The invention will be more readily understood from a reading of the following specification and by reference to the accompanying drawings forming a part thereof, wherein an example of the invention is shown and wherein:

FIGURE 1 is an elevational view illustrating a construction header constructed in accordance with the present invention connecting a natural gas service pipe and consumer pipe, FIGURE 2 is a plan view of a construction header constructed in accordance with the present invention, and FIGURE 3 is a side elevational view of the construction header illustrated in FIGURE 2.

The drawings illustrate a construction header which aids in the installing of pipes for connecting to a gas meter and for testing the pipes against leakage. The construction header includes a first stud A which is connected to a service pipe leading from a gas main for blocking the flow of gas through the pipe. A spacing bar B has one end thereof integral with the first stud A. A second stud C is connected to a pipe on the consumer side of the meter. The second stud C seals an end of the consumer pipe which is normally connected to the gas meter so that pressure can be applied to the consumer pipe from the opposite end for testing joints in the pipe. The spacing bar B has its other end integral with the second stud C. The spacing bar is a preselected length so that the distance between the studs is equal to the distance between the ends of the service pipe and the consumer pipe when they are connected to a gas meter. The spacing bar is constructed of rigid material so as to maintain the service pipe in a fixed position relative to the consumer pipe. The construction header aids in aligning the service pipe relative to the consumer pipe during the installation of the pipes and seals one end of the pipes so that they may be tested for leaks.

There is illustrtaed in FIGURE 1 of the drawings a service pipe referred to generally at 10, which is connected to a gas main (not shown) and a consumer pipe referred to generally at 11 which supplies gas to a building such as a home. A construction header 12 is connected between the ends of the service pipe 10 and the consumer pipe. When a gas meter 13, such as illustrated in broken lines, is to be connected between the service pipe 10 and the consumer pipe 11 for measuring the flow of gas through the pipes, the construction header 12 is removed and the gas meter is substituted therefor.

In installing the pipe assembly for a gas meter, a gas company employee normally installs the service pipe first. The consumer pipe is normally installed during the construction of the building and after the building is completed and ready for occupancy the gas meter is connected to the pipes and the gas is turned on. It is important that the service pipe 10 be properly spaced from the consumer pipe 11 so that a true and accurate installation of the gas meter can be achieved. Moreover, the contractor has to test the consumer pipe for leaks. This test is generally performed immediately after the consumer pipes are installed. The construction header 12 constructed in accordance with the present invention insures proper alignment of the service pipe, prevents contamination of the pipe prior to connecting the gas meter thereto, and provides a convenient means of testing the pipes against leaks. The manner in which the pipes are tested is discussed below.

The lower end 14 of the service pipe 10 is connected to a gas main (not shown) and intermediate the gas main and the end, which normally connects to the gas meter 13, are conventional components. Such components include a cut-off valve 16, a pressure reducing valve 17, and a reducing T joint 18 having a plug 19 in one end. One end of a nipple 20 is connected to the T joint 18 and the other end of the nipple 20 is connected to one side of an elbow 21. The free-end of the connecting nipple 22 terminates in a flange 23 for receiving a threaded slip nut 24. A gasket 25 is disposed between the flange 23 and the slip nut 24 for providing a sealed joint when the construction header 12 or a gas meter 13 is connected thereto.

The end of the consumer pipe 11, which normally connects to the gas meter 13, is provided with identical fittings as the corresponding end of the service pipe. The fittings include a slip nut 24a, a connecting nipple 22a having a flange on one end with a gasket between the flange and the slip nut (not shown), and an elbow 21a coupled to the other end of the connecting nipple 22. A nipple 20a connects the other side of elbow 21a to an elbow 26. The other side of elbow 26 is connected to a vertical pipe 27 which leads into the building that is to receive the gas.

In installing the consumer pipe 11 so that the slip nuts 24 and 24a will be properly spaced for connection to the gas meter 13, a construction header 12 is utilized. The construction header includes a threaded stud A, which is connected to the service pipe 10 by means of the threaded slip nut 24. The stud A seals the end of the service pipe 10. A U-shaped spacing bar B has one end integral with the stud A and its other end integral with the stud C. The horizontal portion 28 of the spacing bar B is a preselected length so that the horizontal distance between the studs A and C is equal to the distance between the ends of the service pipe and the consumer pipe when they are connected to a gas meter. The spacing bar is constructed of rigid material so as to maintain the service pipe 10 in a fixed position relative to the consumer pipe 11. Moreover, the construction header adds rigidity to the pipe assembly so that the assembly is not easily damaged by shocks and jars. Since the spacing between the studs A and B is equal to distance between a gas inlet pipe and a gas outlet pipe on a gas meter, the consumer pipe 11 may be accurately located relative to the service pipe 10 and the pipes do not have to be tampered with when the gas meter is subsequently connected thereto.

The stud C seals one end of the consumer pipe so that the consumer pipe 11 can be tested for leaks. This is accomplished by screwing an apparatus equipped with a valve stem on the other end of the consumer pipe and inserting air into the pipe until pressure builds within the pipe. Normally, the valve stem apparatus and the construction header remain connected to the consumer pipe until the gas company is ready to connect the gas meter. If upon disconnecting the construction header 12 from the consumer pipe 11, there is a sudden release of pressure, it is evident that there are no leaks in the pipe joints and it is safe to connect the gas meter and turn on the gas. If, however, there is no sudden release of pressure, then such is an indication that there is a leak in one of the pipe joints.

In order to check the consumer pipe for leaks without waiting a period of time the stud B is provided with a threaded hole 29. A pressure meter 30 is connected in communication with the hole 29 through a threaded pipe 31. By observing the meter after the consumer pipe has been placed under pressure leakage in the pipe joints can be detected. If the meter indicates a drop in pressure, it is an indication that there is a leak in one of the joints. When the pressure meter is not being used with the construction header 12, a setscrew 32 is secured in the threaded hole 29.

In addition to aiding in constructing the pipe assembly for a gas meter and for testing the pipe joints, the construction header seals the ends of the pipes while they are not being used. Such prevents the pipes from becoming contaminated by dust, dirt, or insects. It is important that the pipes be free of foreign objects so that the small burner openings located in the building do not become stopped up.

While a preferred embodiment of the invention has been described using specific terms, such description is for illustrative purposes only, and it is to be understood that changes and variations may be made without departing from the spirit or scope of the following claims.

What is claimed is:

1. An apparatus for aiding in the installation of pipes for connection to a gas meter and for testing the pipes for leakage including: a first stud, means connecting said first stud to a service pipe leading from a gas main for blocking the flow of gas through said pipe; a spacing bar having one end integral with said first stud; a second stud, means for connecting said second stud to a pipe on the consumer side of the meter, said second stud sealing an end of said consumer pipe which is normally connected to said gas meter so that pressure can be applied to the consumer pipe from the opposite end for testing joints in said pipe; said spacing bar having its other end integral with said second stud, said spacing bar being of a preselected length so that the distance between said studs is equal to the distance between the ends of said service pipe and said consumer pipe when connected to a gas meter; and said spacing bar being constructed of rigid material for maintaining said service pipe in a fixed position relative to said consumer pipe; whereby said apparatus aids in aligning said service pipe relative to said consumer pipe during installation of said pipes and seals one end of said pipes enabling such to be tested for leaks.

2. The apparatus as set forth in claim 1 wherein at least one of said studs has an opening therein, and a pressure meter operatively connected to said opening for aiding in testing said pipes for leaks.

References Cited

UNITED STATES PATENTS

| | | | |
|---|---|---|---|
| 606,851 | 7/1898 | Ware | 33—180 |
| 2,431,100 | 11/1947 | Woods | 33—174 |
| 2,706,499 | 4/1955 | Grable | 138—89 |
| 3,270,426 | 9/1966 | Fischer et al. | 33—174 X |

LOUIS R. PRINCE, *Primary Examiner.*

J. NOLTON, *Assistant Examiner.*